United States Patent [19]
Heimgartner

[11] Patent Number: 5,921,741
[45] Date of Patent: Jul. 13, 1999

[54] TRAILER AND LOADING DEVICE

[76] Inventor: Ernie Heimgartner, 3411 Skyline Dr., Clarkston, Wash. 99403

[21] Appl. No.: 09/140,621

[22] Filed: Aug. 26, 1998

[51] Int. Cl.⁶ .................................................. B60R 9/00
[52] U.S. Cl. ...................... 414/462; 414/494; 414/480; 414/538
[58] Field of Search ................... 414/462, 494, 414/480, 537, 538; 410/30

[56] References Cited

U.S. PATENT DOCUMENTS

| | | | |
|---|---|---|---|
| 2,958,432 | 11/1960 | Milhem | 414/538 |
| 3,550,800 | 12/1970 | Robinaon | 414/462 |
| 3,648,866 | 3/1972 | Slown | 214/450 |
| 3,708,081 | 1/1973 | Schladenhauffen | 414/462 |
| 3,734,321 | 5/1973 | Long et al. | 214/450 |
| 3,840,133 | 10/1974 | Berg | 214/450 |
| 3,843,002 | 10/1974 | Pihlgren | 414/462 |
| 3,877,594 | 4/1975 | Coakley | 214/450 |
| 3,894,643 | 7/1975 | Wilson | 414/462 |
| 4,094,527 | 6/1978 | Miller | 280/414.1 |
| 4,804,070 | 2/1989 | Bohler | 410/30 |
| 5,069,595 | 12/1991 | Smith et al. | 414/462 |
| 5,071,308 | 12/1991 | Tibbet | 414/462 |
| 5,108,248 | 4/1992 | Murrill | 414/462 |
| 5,123,799 | 6/1992 | Breazeale | 414/462 |
| 5,232,329 | 8/1993 | Livingston | 414/494 |
| 5,447,408 | 9/1995 | Smith | 414/538 |
| 5,603,600 | 2/1997 | Egan et al. | 414/462 |
| 5,609,462 | 3/1997 | Reimer | 414/462 |
| 5,620,296 | 4/1997 | McMahon et al. | 414/462 |
| 5,741,110 | 4/1998 | Grinage, Jr. | 414/462 |
| 5,810,546 | 9/1998 | Schmoling | 414/538 |
| 5,816,757 | 10/1998 | Huston | 410/30 |

*Primary Examiner*—Christopher P. Ellis
*Assistant Examiner*—Douglas A. Hess
*Attorney, Agent, or Firm*—Wells, St. John, Roberts, Gregory & Matkin P.S.

[57] ABSTRACT

A trailer and loading device is described that is releasably mountable to a truck including a forward cab and a rearward truck bed including upright bed walls and a bed floor. The device includes a frame configured to be mounted within the pickup truck bed adjacent the cab, and a ramp mounted to the frame and extending angularly upward and forwardly. A rearward bottom end of the ramp is configured to be positioned adjacent the truck bed. The ramp extends to a forward elevated top end configured to extend forwardly over the frame. A trailer is releasably mounted to the frame in an inclined carrying position. Wheels of the trailer are configured to rest against the floor surface of the truck bed between the upright bed walls. A forwardly extending tongue on the trailer includes a follower configured to move along the ramp. A winch is operably secured to the frame and is operable to enable the trailer to move rearwardly on the wheels and with the follower moving rearwardly and downward along the ramp to a towing position.

19 Claims, 11 Drawing Sheets

TRAILER AND LOADING DEVICE

TECHNICAL FIELD

The present invention relates to mounting and dismounting trailers onto and off from trucks.

BACKGROUND OF THE INVENTION

It is often desirable for owners of motor homes, or vehicle pulled camper trailers to also have access to a boat, motorcycles, personal watercraft or other recreational vehicles. However, it has not been feasible to tow a trailer behind a camper trailer. It is also difficult to maneuver a motor home with an attached trailer. This is especially true for boat trailers when loading and unloading the boat at a landing.

In the case of motor homes, it is often more desirable to tow a second vehicle so the second vehicle may be used when the motor home is parked. This is often done since motor homes are difficult to maneuver and park in many areas not designated for motor homes.

As a partial solution to the above problems, the second vehicle is used to pull the trailer. While this solution is effective, it is not particularly fuel efficient to use the two vehicles (motor home and second vehicle) simultaneously.

The above problems are recognized to a limited degree by designers of trailer loading and unloading devices that mount to trucks. A boat, for example, and boat trailer may be mounted by such a device in a carrying position on a truck. This reduces the overall length of the two units and allows the truck to be towed behind a motor home, or allows the truck to carry the trailer and boat while simultaneously pulling a camper trailer. In some cases the truck may be loaded with the boat and trailer, then attached to a camper trailer so both the camper trailer and boat trailer may be transported using a single towing vehicle.

While the concept of hauling a trailer on a truck is feasible, as a practical matter, the structures used to load and unload the trailers have had problems. Most if not all prior trailer loaders will elevate the trailer and boat (or other load) to a position higher than the truck cab. This causes dangerously poor handling since the center of gravity for the truck becomes elevated. Trucks loaded in this manner have a tendency to lean heavily in corners and in cross winds. Further the loading mechanisms are heavy themselves and therefor severely limit the size and weight of the boat or whatever load is to be carried on the trailer. Still further, the loading devices are typically complex and expensive.

Another weight transfer problem stems from the contact between the trailers and the loaders. Prior loaders typically offer a three point support between the carrying frame and trailer; two being at the trailer wheels and the third being a forward central point below or in alignment with the trailer tongue. Lateral stability is adequate in the vicinity of the wheels, but is not nearly as adequate in the area of the single central forward support.

The present trailer loading and unloading device eliminates several of the above problems by providing a simple, low cost, yet effective device for carrying a trailer in a low profile position such that the center of gravity of the truck is not significantly raised, and the trailer is supported at four points for maximum stability. Further the present trailer and loading device is intended to be relatively light weight so the payload to be carried on the trailer may be increased. Still further, the present trailer and loading device enables the truck to pull a camper trailer without significantly sacrificing the "towability" of the camper trailer.

The above and other advantages and objects of the present invention will become apparent from the following description, which, taken with the accompanying drawings, describe a preferred form of the present invention.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The present invention is provided to be mounted to a conventional truck which is generally shown in the drawings by reference numeral 10. The truck typically used with the present invention will be a standard pickup truck having a forward cab 11 with a relatively flat cab top surface 12. A load carrying bed 13 is situated behind the cab and is comprised of bed side walls 14 that extend upwardly to relatively horizontal top wall surfaces 15. A support such as a bed floor 16 is situated below the top wall surfaces and spans the areal dimension of the bed and terminates in a rearward bed end 17. Fender wells 18 are typically found within the bed on "fleetside" truck models and on "stepside" models (not shown) the fender wells are situated outside the bed walls. It is preferable that the present invention be used with full-sized "fleetside" truck models, or any other truck bed having a bed floor width (between side walls) of approximately 5 feet. The present invention may also be mounted on trucks of the "flatbed" variety in which no side walls are provided but which include a bed width of at least 5 feet.

It is pointed out that the present invention is intended to be mounted to a truck and that the truck itself therefor does not form a part of the invention. The above components of the truck 10 are described simply to lend a better understanding and definition of the invention.

The present invention is embodied in a trailer and loading device 20 that can be releasably mounted to the pickup truck 10 to enable a load (such as a boat 21) and the present trailer 22 to be either towed behind the truck 10 or to be carried above the truck bed 13.

A preferred form of the present device 20 includes a frame 25 that is configured to be mounted within the pickup truck bed 13 adjacent the cab 11. Preferably the frame is mounted to the bed floor 16 by conventional means such as bolt and nut combinations or other releasable fasteners (not shown) to enable mounting and dismounting of the frame 25.

The exemplified frame 25 includes an upright brace section that includes a cross member 26 positioned atop and spanning spaced apart rigid upright legs 27 that are secured to the truck bed adjacent the cab 11. The cross member 26 (FIG. 19) is preferably substantially horizontal and transverse in relation to the bed, and is elevationally positioned adjacent the cab top surface 12. The cross member 26 is used to receive and support a forward portion of the trailer 22 and boat (or other payloads) 21 in an inclined carrying position (FIG. 1) over the bed floor 16.

Figures 17A, 17B:
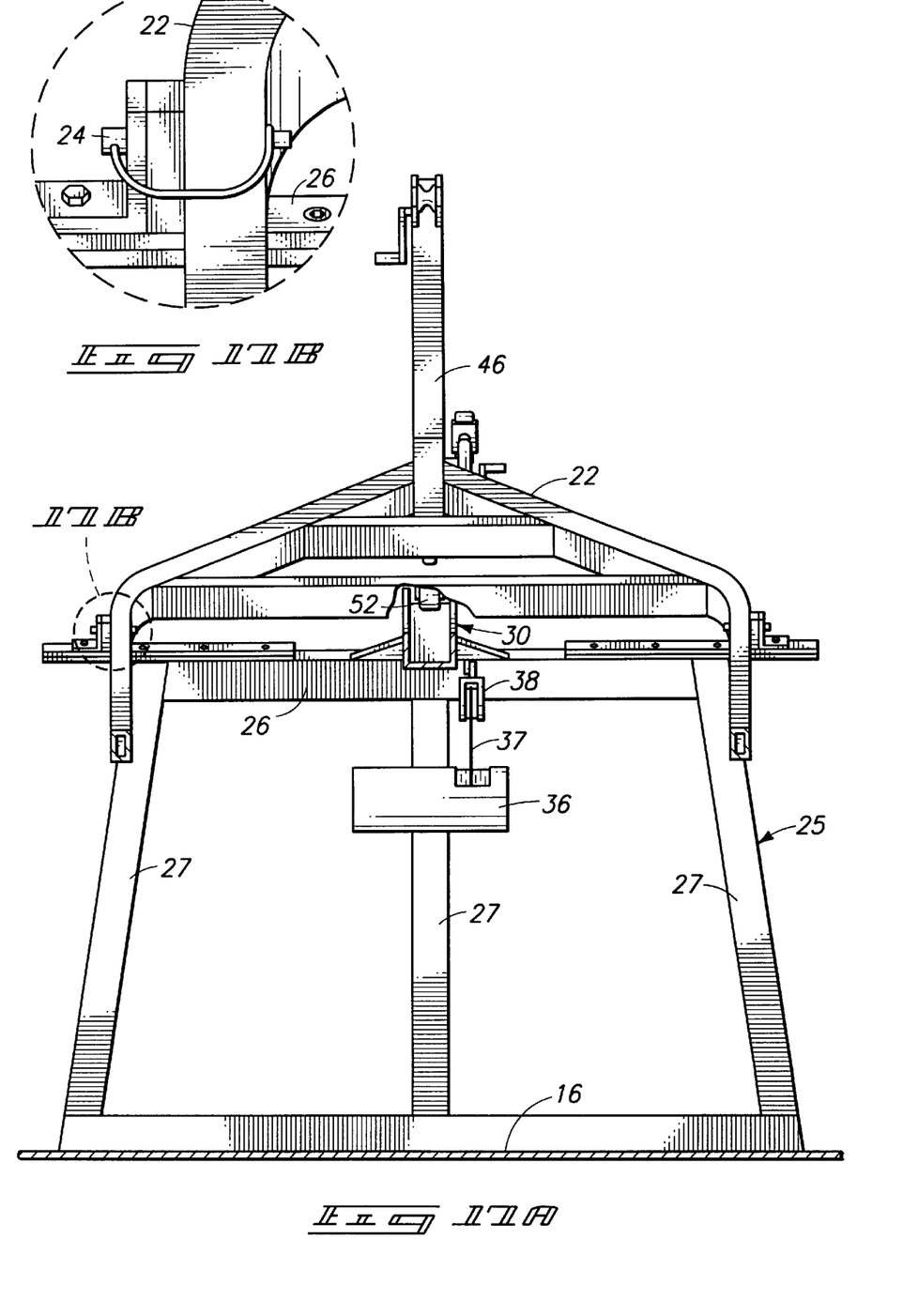
FIG. 17A is a cross sectional view taken substantially along line 17A—17A in FIG. 2.
FIG. 17B is an enlarged fragmented detail view within the area identified at 17B in FIG. 17A.

The cross member 26 makes two point contact with the trailer frame in the carrying position as shown in FIG. 17A. The contact points are spaced laterally of the ramp and are substantially directly over the upright legs 27 so the trailer weight borne by the cross member is transmitted directly to the truck bed through the legs 27.

The two forward contact points add to lateral stability of the trailer and payload at the forward end of the trailer in comparison to single point support found in many other forms of carriers. Where prior loaders support the trailer at the tires and tongue (three point support, the present trailer is supported at four stable contact points: two contact points at the rear of the truck bed where the trailer tires are supported on the bed floor, and two contact points above the forward end of the bed where the forward part of the trailer frame rests against the cross member 26.

Figure 19:
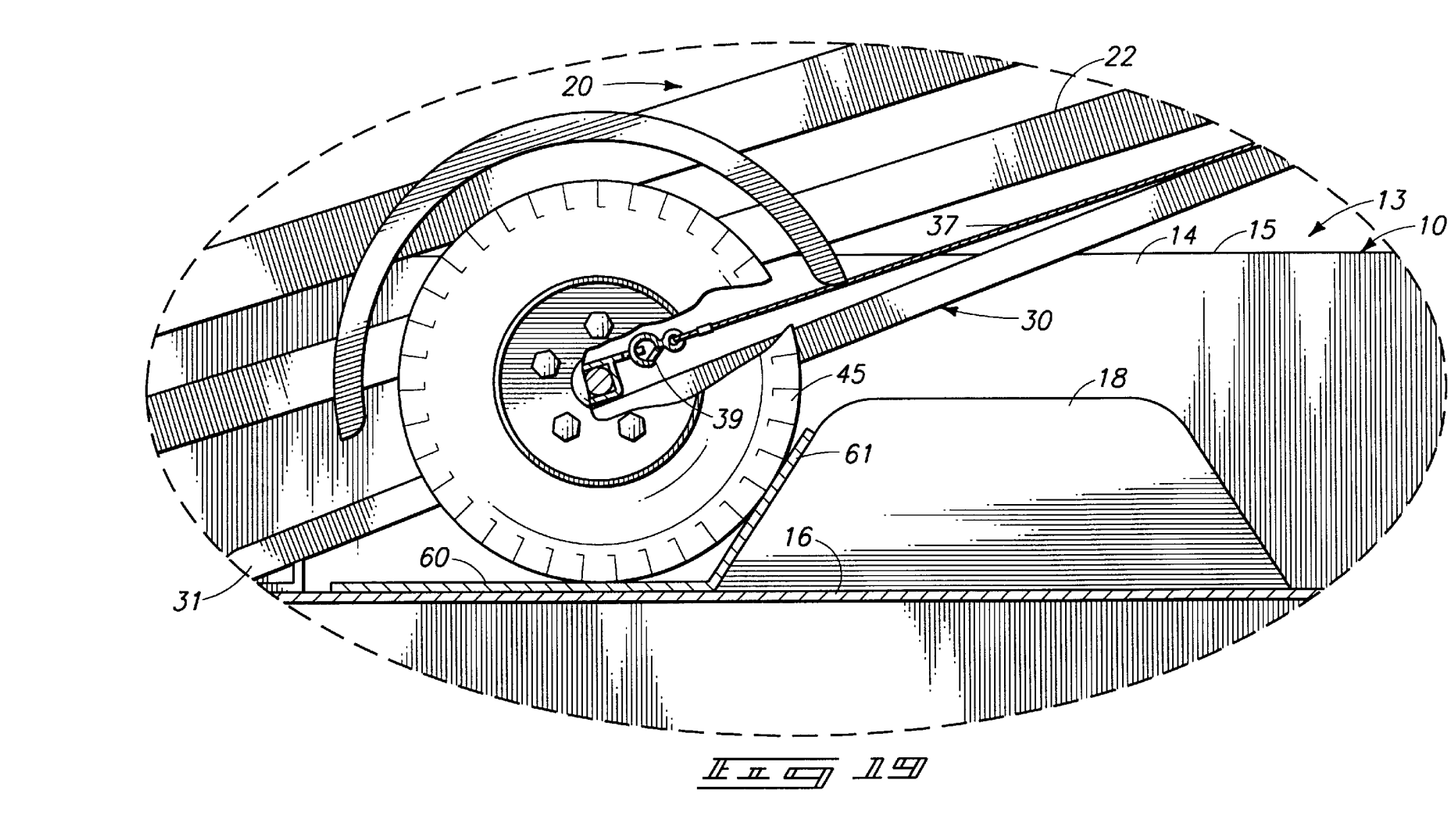
FIG. 19 is an enlarged fragmented detail view within the area identified at 19 in FIG. 3.

A lock 24 may be provided to selectively interconnect the trailer 22 and frame 25 and to rigidly lock the trailer and frame together at the support surface of the cross member 26 (FIG. 19). The lock 24 may be provided in the form of conventional locking pins or clips that may be selectively removed to permit unloading of the trailer. However, when locked, the trailer becomes effectively anchored to the frame and truck. High winds or sharp turns will not dislodge the trailer from the carrying position so long as the lock holds.

Though the frame 25 may be constructed of different appropriate materials, rigid aluminum channel is preferred to minimize the frame weight. The lightweight frame 25 thus maximizes the ability of the device 20 to carry payloads, up to the safe limit capacity of the truck, with the bulk of the payload being the boat or other load to be transported, rather than in the device 10.

A ramp 30 is mounted to and becomes a part of the frame 25. In preferred forms, the ramp 30 extends angularly upward and forwardly from a rearward bottom end 31. The rearward ramp end 31 is configured to be positioned adjacent the truck bed (more specifically the bed floor 16 at the rearward bed end 17). The ramp 30 extends from the rearward end 31 (FIGS. 18A, 18B and 19) forwardly and upwardly to a forward elevated top end 32 (FIG. 1) which is advantageously configured to extend forwardly over the frame 25 and the truck cab 11.

The ramp 30 is preferably centrally located on the frame 25 and over the bed floor 16, as may be seen in FIG. 17a. As shown therein, the preferred ramp 30 includes a "U" shaped cross section that is used to center and guide the trailer 22 as it is loaded and unloaded. It is also preferred that the "U" shaped ramp be formed of aluminum to minimize frame weight.

Figure 1:
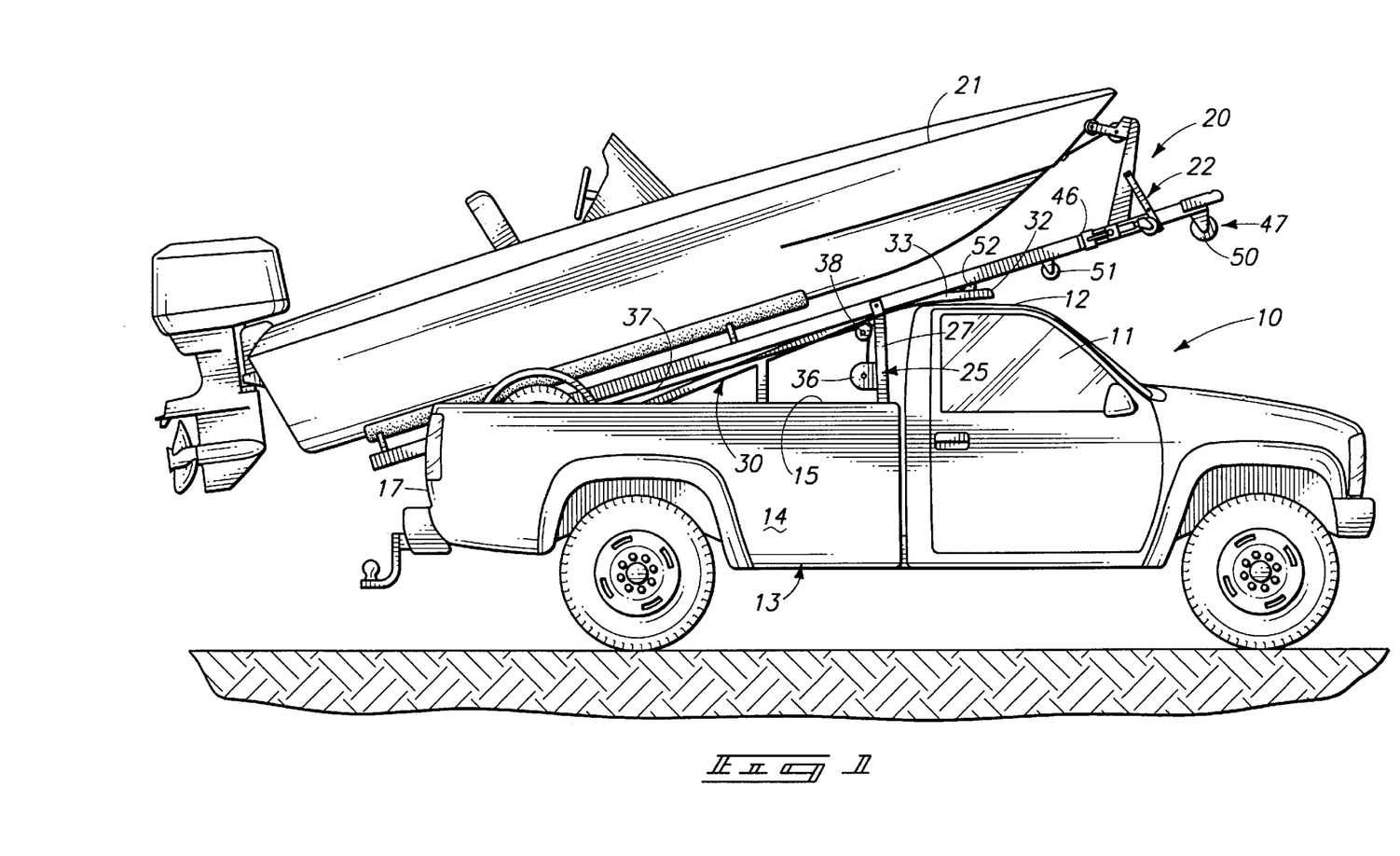
FIG. 1 is a side elevation view of a truck with a preferred form of the present trailer and loading device in place thereon carrying a boat.
Figure 2:
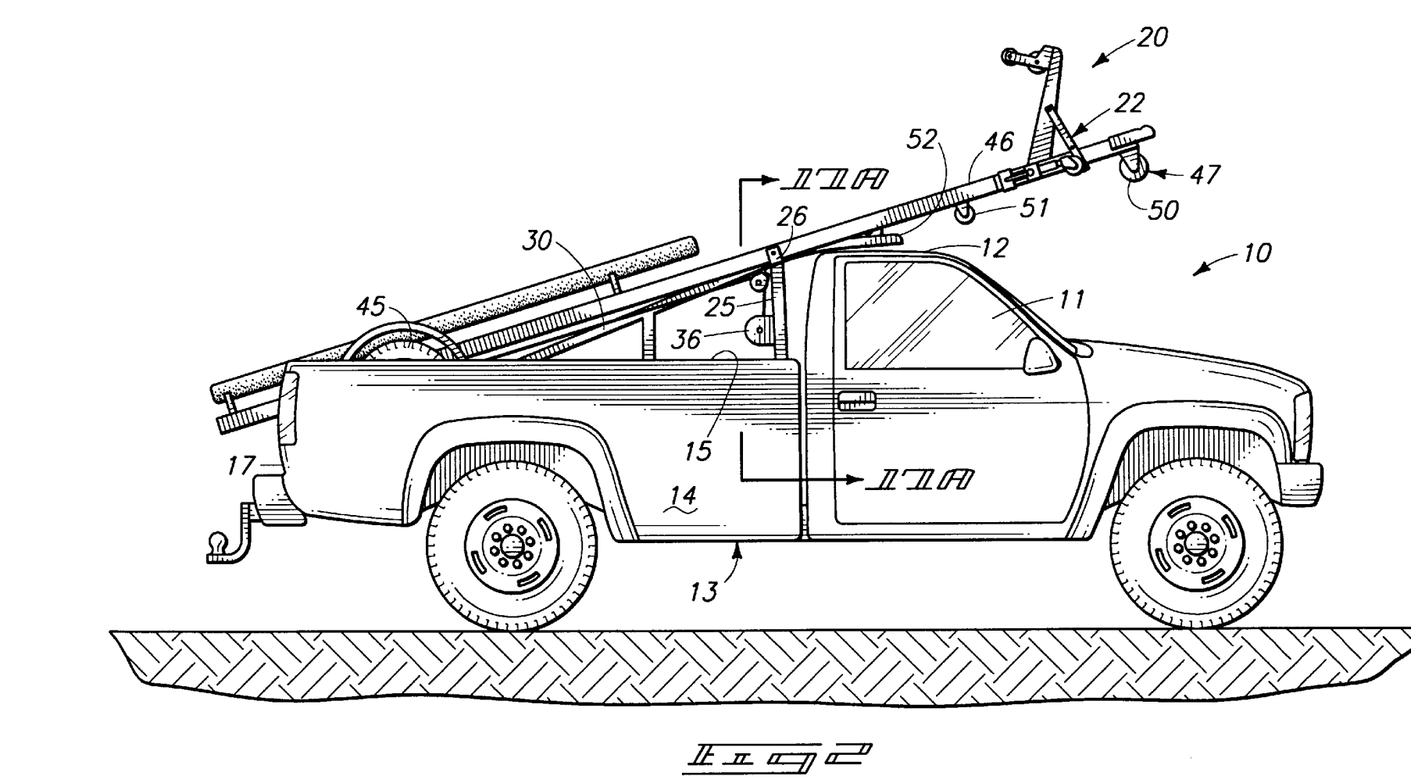
FIG. 2 is a view similar to FIG. 1 only showing the present device in place on the truck without a boat.
Figure 3:
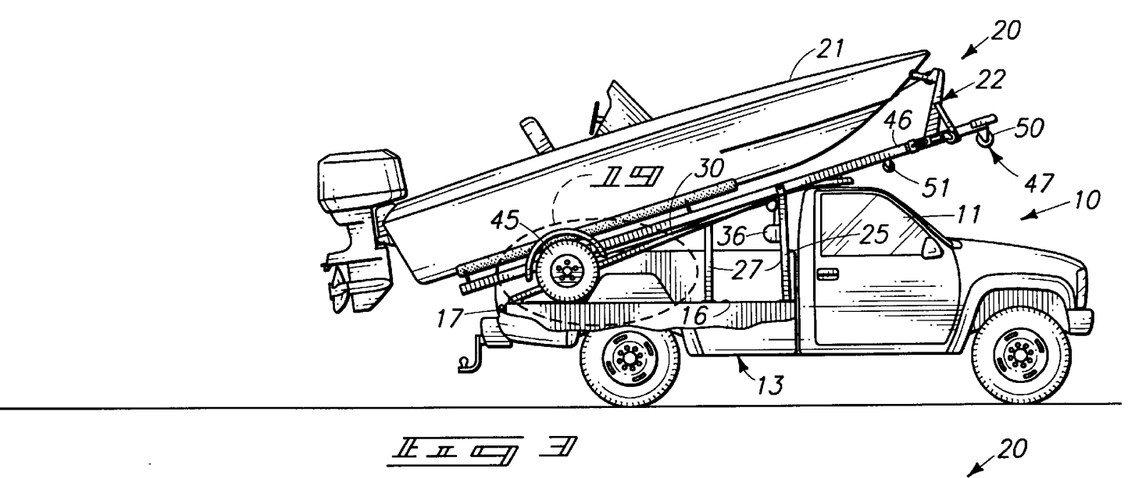
FIGS. 3–12 represent a sequence in which the present trailer is progressively unloaded from the truck.

It is preferred that a forward end section 33 of the ramp 30 be disposed angularly downward with respect to the upwardly inclined angle of the primary length of the ramp. The forward end section 33 bends to a substantially horizontal orientation that conforms substantially with the top surface 12 of the truck cab. The forward end section 33 is configured to extend over the cab 11 and should be situated no more than approximately 1.5 inches above the truck cab top surface 12. The forward ramp end section 33, thus positioned in close proximity to the truck cab top surface 12, will aid in maintaining a low profile for the trailer 22 and boat 21 substantially as shown in FIG. 1.

In preferred forms, a winch 36 is operably secured to the frame 25 to assist in loading and unloading the trailer 22 (and the payload carried on the trailer). In the example illustrated, the winch is secured between the upright frame legs 27 and below the cross member 26.

The winch 36 may be of a conventional form of the type typically used for loading and unloading boats onto and off from boat trailers. It is possible for the winch to be of a conventional manual variety, but the preferred form is powered (by electrical energy supplied from the truck 10) in a conventional manner.

The winch 36 may include a conventional winch cable 37 leading to a free end that is supplied with a hook or other appropriate fastener 39 (FIG. 19) that may be attached to the trailer 22 substantially in the manner shown. The illustrated cable 37 passes over a common pulley 38 that is pivotally secured to the frame 25 below the cross member 26 and slightly to one side of the ramp 30 (see FIG. 17A).

The trailer 22 is releasably mounted to the frame 25 in an inclined carrying position as shown in FIG. 1. The preferred trailer 22 includes wheels 45 configured to rest against the floor 16 of the truck bed between the upright bed side walls 14. The distance between the wheels is thus less than the distance between the bed side walls 14 so the wheels will fit easily between the walls and be supported on the bed floor 16. The center of gravity for the trailer and the load carried is thus held as low as possible.

The wheel spacing and a forwardly extending tongue 46 with a follower 47 may be the only non-conventional aspects of the trailer, which otherwise may take substantially any of a variety of trailer forms known in the trailer art. Such conventional details of the trailer will not be described further.

The trailer wheels 45 are spaced to be movably received between the bed side walls 14 and the follower 47 is configured to move along and be guided by the ramp 30. The wheels 45 may thus be positioned to rest and bear against the truck bed floor 16, and the forward portion of the trailer and payload will rest on the frame 25 at the two contact points discussed above.

The follower 47, in a preferred form, is comprised of at least one roller mounted to the tongue of the trailer. In the example shown, three of such rollers 50, 51, and 52 are provided along the trailer tongue. The first or forward roller 50 is situated adjacent the hitch socket of the trailer. The second or middle roller 51 is located behind the forward roller 50 and in line therewith along the trailer tongue. The third or rearward roller 52 is situated further back and in alignment with the other two rollers 50, 51. All rollers 50, 51, and 52 are positioned to be received and guided by the ramp 30, between the upright side walls of the "U" shaped ramp cross-sectional configuration.

Figure 13:
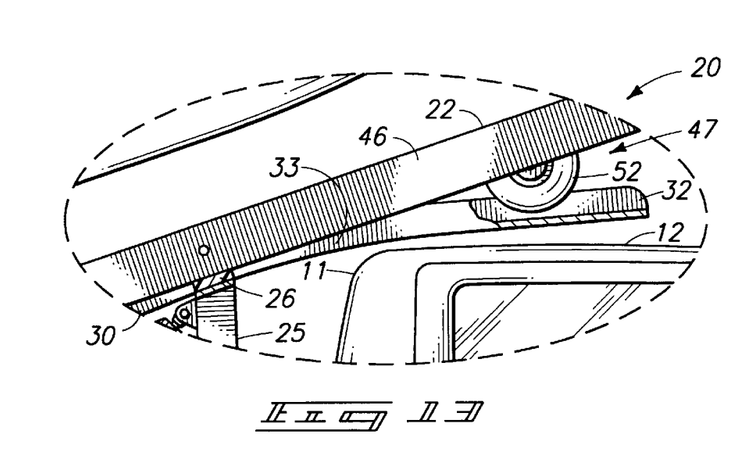
FIG. 13 is an enlarged fragmented detail view within the area identified at 13 in FIG. 4.
Figure 14:
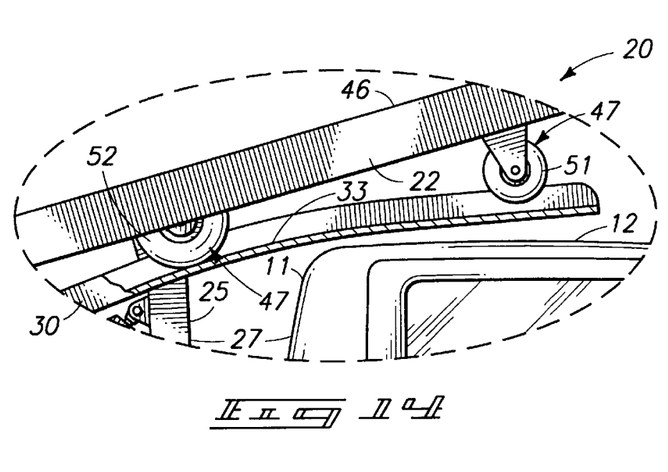
FIG. 14 is an enlarged fragmented detail view within the area identified at 14 in FIG. 5.
Figure 15:
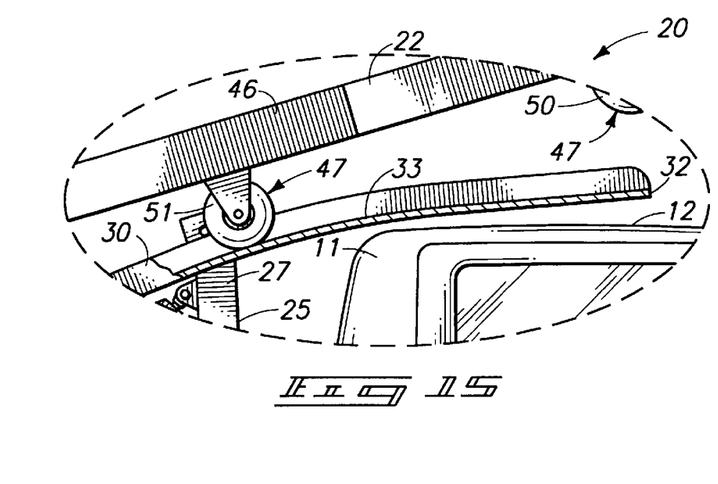
FIG. 15 is an enlarged fragmented detail view within the area identified at 15 in FIG. 6.
Figure 16:
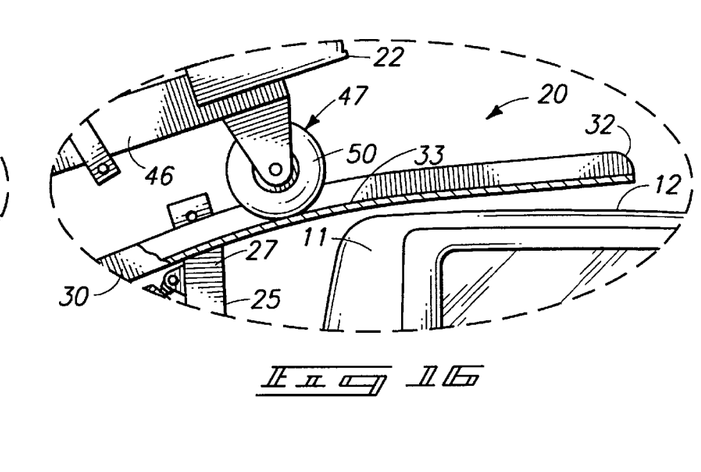
FIG. 16 is an enlarged fragmented detail view within the area identified at 16 in FIG. 7.

All three rollers will engage and roll along the ramp 30 at different times during loading and unloading of the trailer. This action is shown in the succession of views including FIGS. 13–16. In FIG. 13 all three rollers are suspended above the ramp, and the forward part of the trailer is resting in two point contact against the cross member 26. This is done to eliminate weight bearing against the forward end section 33 of the ramp 30, and to better stabilize the trailer during transit.

When the trailer is being unloaded, the rearward roller 52 (FIG. 14) will first engage the ramp 30 as the trailer slides off the frame 25 and begins to descend rearwardly, while tipping the trailer frame slightly upward from the two point contact with the cross member 26. Roller 52 now supports the forward tongue section of the trailer on the ramp 30 over the frame 25. Then as the trailer continues moving down the ramp 30, the second roller 51, and subsequently the first roller 50 will successively engage the ramp (FIGS. 15 and 16), in the vicinity of the frame 25 to minimize loading of the forward ramp end section 33 as the trailer moves downwardly.

Conversely, when the trailer is drawn up onto the truck, and nears the fully loaded position, the rollers 50, 51, and 52 will progressively leave contact with the ramp in reverse order. The first roller 50 will ride over the downward bend along the forward ramp end section 33, then leave contact as the second roller 51 engages the ramp 30. Support is thus shifted to the second roller 51. Then as the second roller 51 continues forwardly along the down turned ramp section, the third roller 52 engages the ramp 30 and supports the forward tongue section. Finally when the third roller 52 drops over the down turned forward ramp end section 33, the trailer frame 25 progressively descends to engage against the frame 25 and the weight of the forward portion of the trailer (and load) becomes borne by the frame 25 in the described direct two point contact on opposite sides of the ramp as shown in FIG. 17A.

The succession of rollers 50, 51, and 52 thus lend mobile support for the forward portion of the trailer frame 25 and load while loading and unloading the trailer. However, forward weight of the trailer frame and load are borne by the cross member and frame 25 in the two point contact position when the trailer is in the full transport condition.

A pair of wheel chocks 60 (FIG. 19) are advantageously provided, and are configured to be positioned on the truck bed floor 16. Preferably, the wheel chocks 60 are situated just rearwardly of the fender wells 18 in alignment with the trailer wheels 45 to engage the wheels and prevent the trailer from moving forwardly past the carrying position. The wheel chocks 60 may be bolted or otherwise secured to the truck bed floor 16 to situate upturned ends 61 of the chocks 60 in position for abutment with the trailer wheels 45 as the trailer reaches the full carrying position.

In preferred forms of the present device, a pair of wheel ramps 65 are provided to facilitate loading and unloading of the trailer. The wheel ramps 65 are configured to be selectively mounted between the truck bed and ground surface to guide and support the wheels of the trailer during loading and unloading. Each of the wheel ramps 65 is elongated, having a forward end 66 configured to be selectively attached to the truck bed. Each wheel ramp 65 also includes a rearward end 67 configured to engage the ground surface rearwardly and downwardly of the forward end 66. When positioned as described between the truck bed and ground, the wheel ramps 65 are upwardly inclined at an angle similar to the angular orientation of the central ramp 30.

Figure 18A:
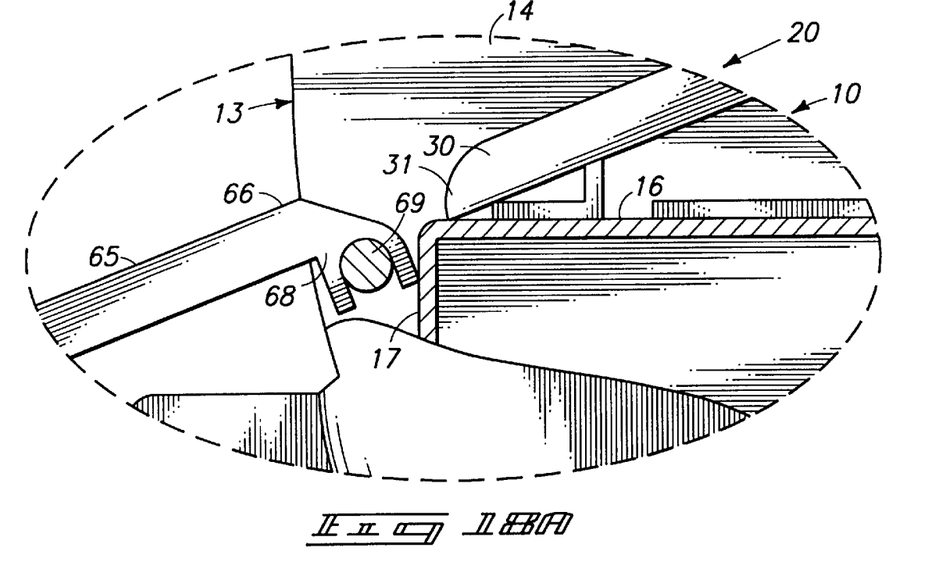
FIG. 18A is an enlarged fragmented detail view within the area identified at 18A in FIG. 4.
Figure 18B:
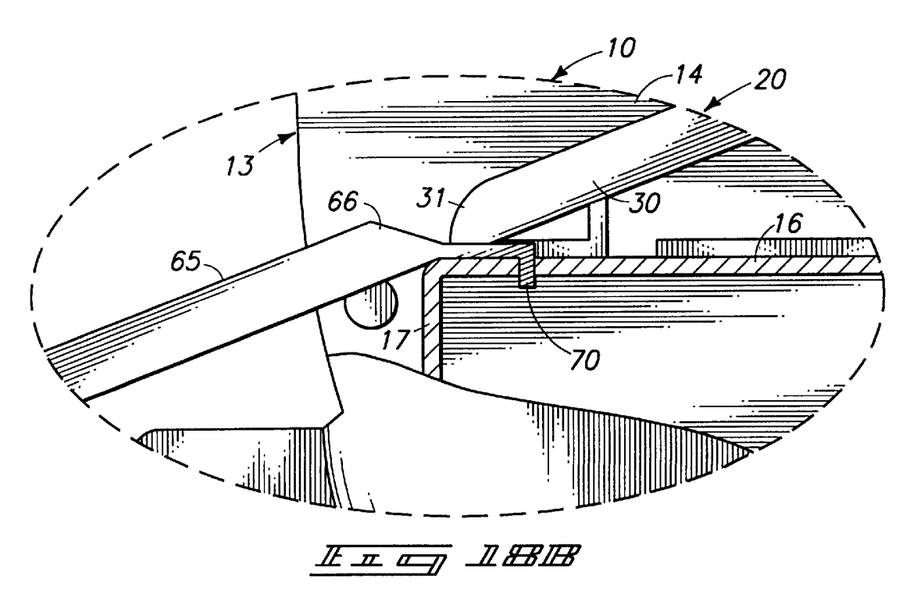
FIG. 18B is an enlarged fragmented detail view of an alternate configuration of the components within the area identified at 18B in FIG. 4.

FIGS. 18A and 18B show alternate embodiments for the forward ends 66 of the wheel ramps 65. In FIG. 18A, the ramp end is configured with a downwardly open, inverted "U" shaped hook 68 shaped to be received over a horizontal transverse bar 69 secured to the truck bed. The bar may be secured to conventional tail-gate hinge members commonly provided in modern pickup trucks, or may be otherwise secured to the truck at the rearward end of the bed. The ramps may be hooked over the bar and positioned in alignment with the trailer wheels 45. FIG. 18B shows the forward ramp ends with a downwardly projecting pin 70 that may be received through a hole formed in the bed. In either form, the intent is to releasably secure the ramps 65 in position to provide support for the trailer as it is being loaded and unloaded.

It is noted that the ramps 65 are not used when the trailer and payload are in the full carrying position as shown in FIG. 1. The ramps are simply carried in the truck bed at this time and are removed and positioned as described above when the trailer is to be unloaded or loaded.

Given the above description, operation of the invention may now be easily understood. Operation of the present device will be described assuming the trailer is in the full carrying position as shown by FIG. 1. With the trailer in this position, the truck may be attached to and towed by a conventional motor home. Alternatively if the truck is to be used as a towing vehicle, a camper truck may be connected to the truck for transport. In either situation, the trailer and boat (or other payload) are carried by the truck in a low profile such that the overall center of gravity of the mass is maintained as close to the ground as possible. This is due to the low angle carrying position with the trailer wheels 45 resting against the truck bed floor 16 and the trailer tongue carried in close proximity to the truck cab.

Figure 4:
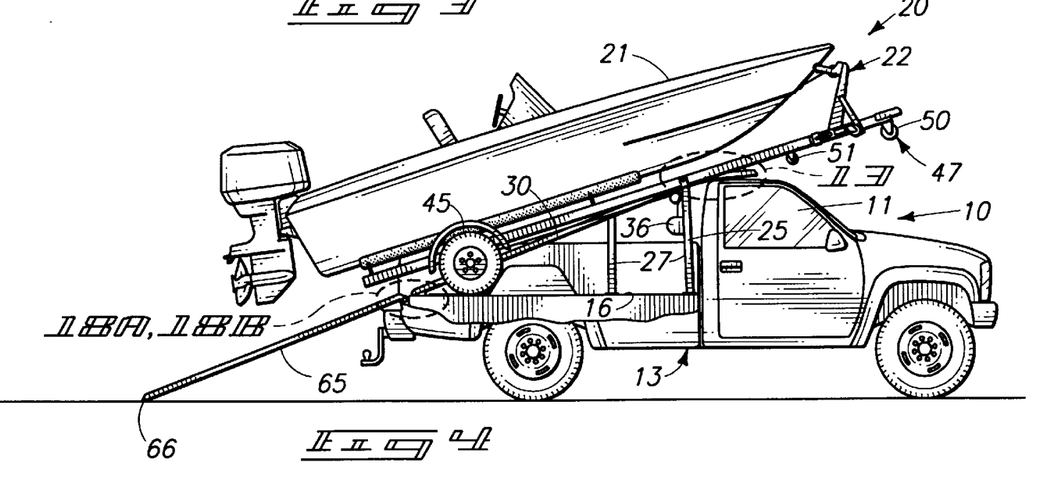

In order to unload the trailer, the user simply positions the truck on level ground, then moves the wheel ramps 65 into position as shown by FIG. 4, in rearward alignment with the trailer wheels 45. The winch line is connected to the trailer (if this step has not already been performed) at the trailer axle as shown in FIG. 19, and the locks 24 are removed. The winch may now be operated to lower the trailer.

Figure 8:
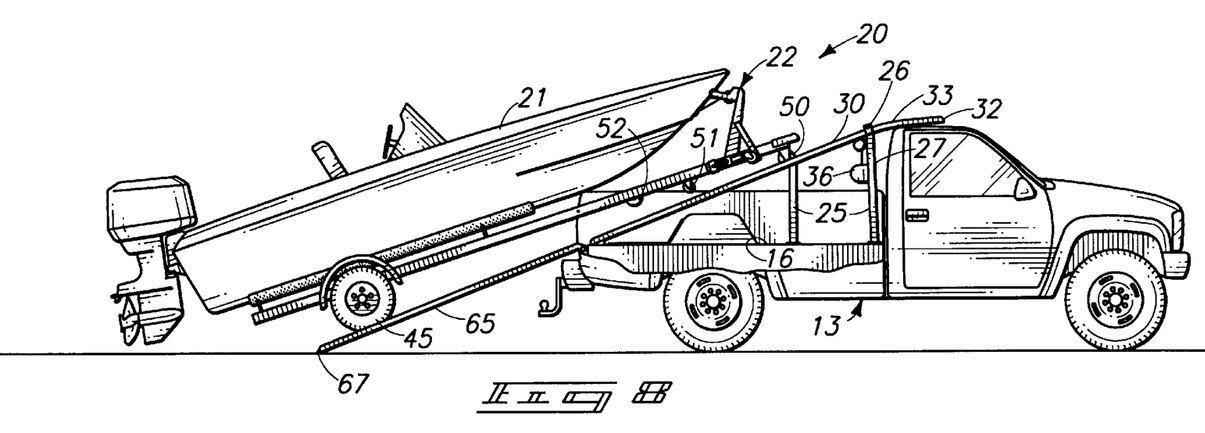
Figure 9:
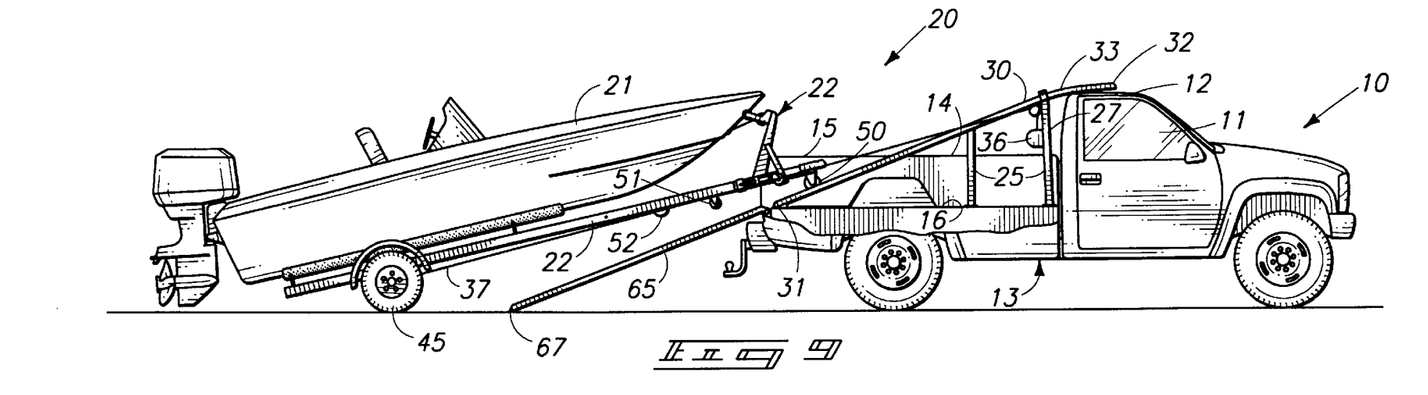
Figure 10:
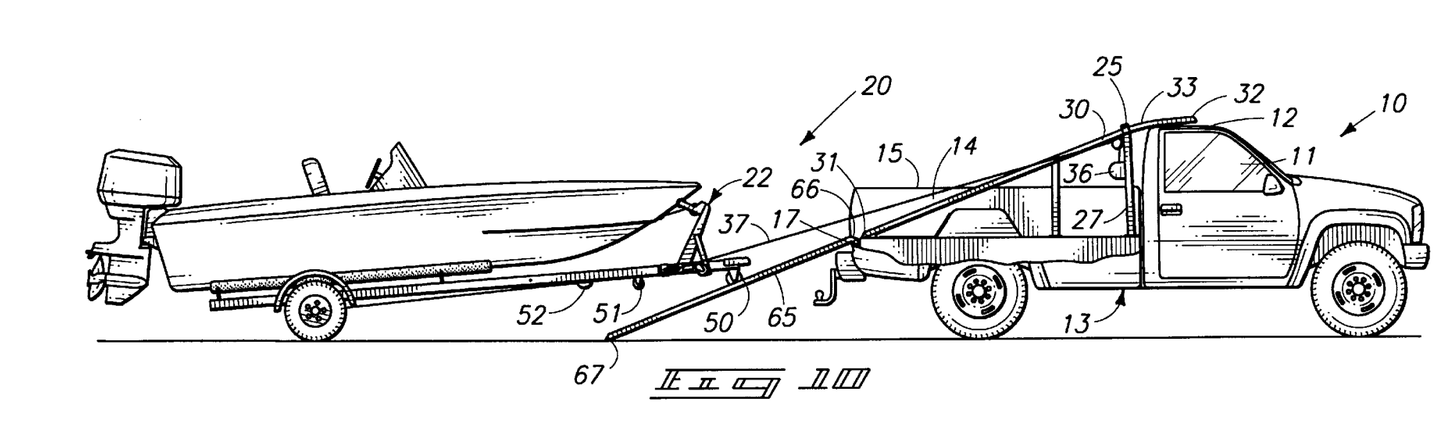

As winch cable is payed out from the winch, the force of gravity will cause the trailer to move rearwardly. The trailer will move down the wheel ramps 65 as shown in progression by FIGS. 5–9 until the trailer becomes supported on the ground surface and by the central ramp 30. Now one of the wheel ramps 65 is shifted into alignment with the central ramp 30 (FIG. 9). The re-positioned wheel ramp 65 will receive the roller 50 on the trailer tongue (FIG. 10) and guide the trailer on downwardly to a substantially horizontal position. As this happens (FIG. 11) the operator may make use of the conventional tongue jack typically provided on trailers to engage the ground and hold the trailer in position for connection to the truck towing ball. If desired, the winch line may now be removed and retracted. Also at this time, the ramps 65 may be removed and stowed in the truck.

Figure 12:
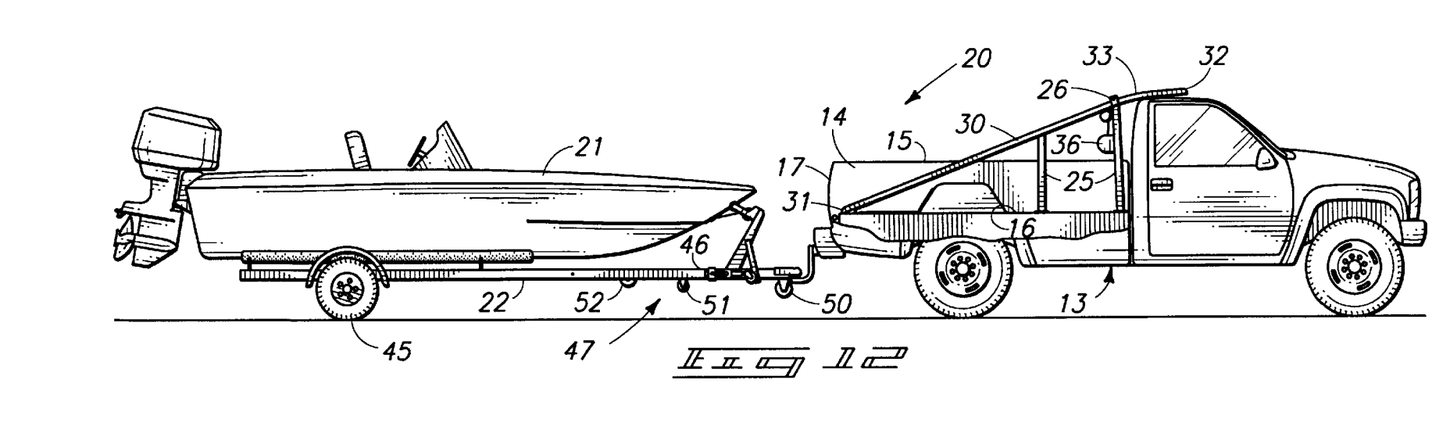

Now the trailer is ready to be connected to the truck for normal towing as shown by FIG. 12.

Figure 11:
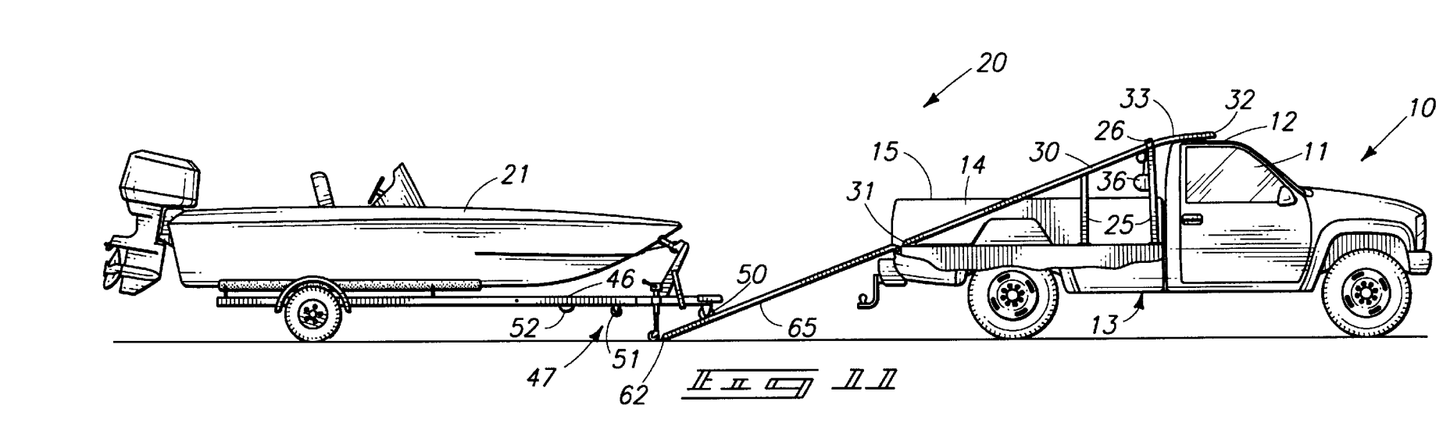

To load the trailer, a basic reverse of the steps described is performed. Assuming the trailer to be disconnected from the truck, the user will first manipulate the truck or trailer so the trailer tongue is in the approximate towing position in rearward alignment with the truck bed. Now one of the wheel ramps 65 is positioned in alignment with the central ramp 30 and with the rearward end in ground engagement adjacent the forward end of the trailer tongue (FIG. 11). The winch line connector 39 may now be attached to the trailer axle and the winch 36 is operated to retract the cable.

As the cable 37 is retracted, the trailer is drawn forwardly. The first roller 50 engages the wheel ramp 65, and rolls upwardly, lifting the forward end of the trailer frame angularly upward (FIG. 10) toward the central ramp 30. When the forward roller 50 moves onto the central ramp 30 (FIG. 9), the one wheel ramp 65 may be repositioned, along with the remaining wheel ramp 65, into alignment with the trailer wheels 45. The tongue and forward end of the trailer are now movably supported and guided by the central ramp 30, and the wheels 45 will start up the wheel ramps 65 (FIG. 8, 7).

Figure 5:
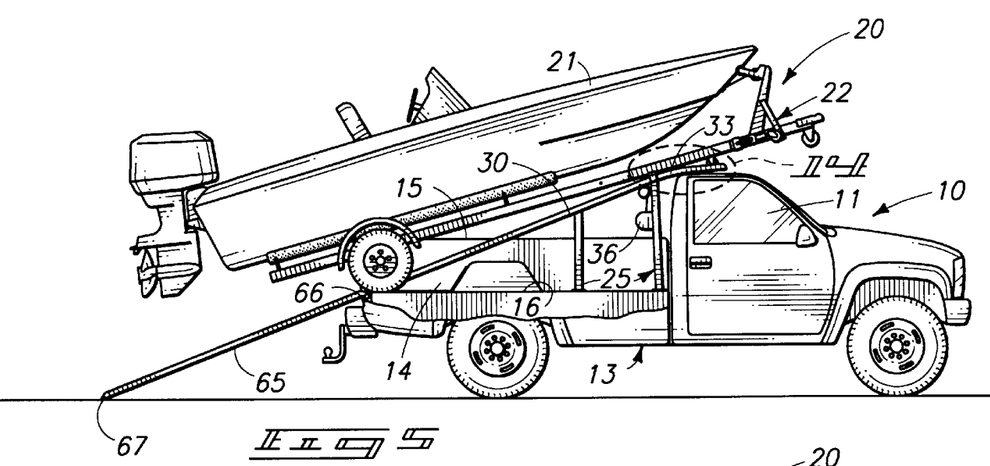
Figure 6:
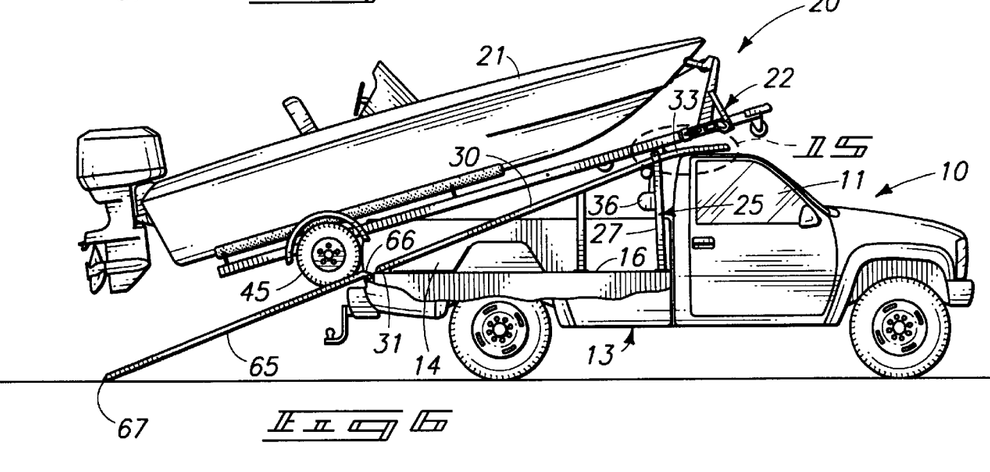
Figure 7:
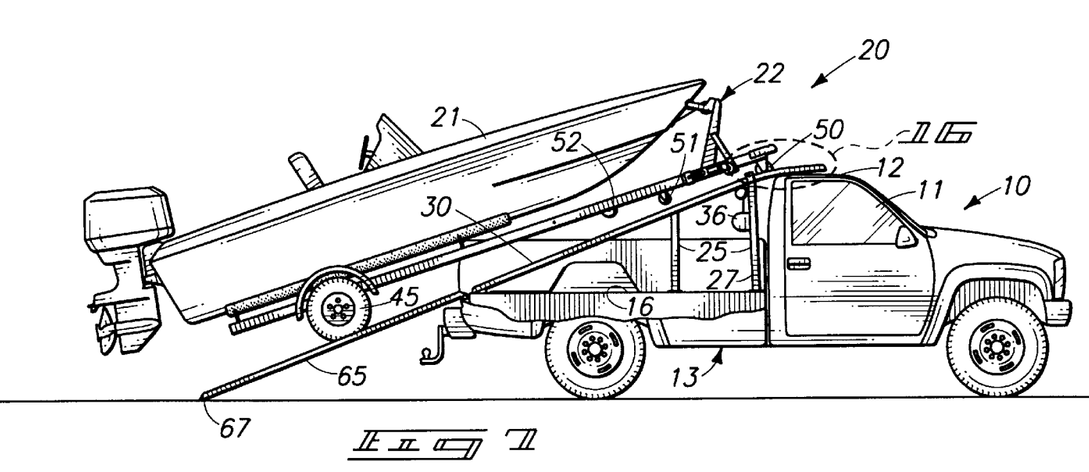

Continued retraction of the winch cable causes the trailer to continue its ascent, with the wheels 45 moving on up the ramps 65 and the roller 50 continuing on upwardly as guided by the central ramp 30 (FIGS. 6, 5, and 4). As the trailer approaches the full carrying position, the rollers 50, 51, and 52 progressively leave engagement with the central ramp, and the trailer frame comes to rest against the frame 25. The trailer is now fully loaded. The wheel ramps may now be removed and stowed in the truck bed and the locks 24 are placed to secure the trailer to the frame 25.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A trailer and loading device for a truck including a forward cab and a rearward truck bed including upright bed walls and a bed floor, the device comprising:
    a frame configured to be mounted within the pickup truck bed adjacent the cab;
    a ramp mounted to the frame and extending angularly upward and forwardly from a rearward bottom end configured to be positioned adjacent the truck bed, to a forward elevated top end configured to extend forwardly over the frame;
    a winch operably secured to the frame;
    a trailer releasably mounted to the frame in an inclined carrying position and having a forwardly extending tongue wheels configured to rest against the truck bed between the upright bed walls whereby the trailer and loading device is designed to have the trailer wheels rest on the bed floor during transit by a truck, for additional load support stability, and;
    a follower on the trailer configured to move along the ramp;
    wherein the winch is selectively operable to enable the trailer to move rearwardly on the wheels and with the follower moving rearwardly and downward along the ramp to a towing position.

2. The trailer and loading device of claim 1 further comprising:
    wheel ramps configured to be selectively mounted between the truck bed and ground surface to guide and support the wheels of the trailer.

3. The trailer and loading device of claim 1 further comprising
    a pair of elongated wheel ramps having forward ends configured to be selectively attached to the truck bed and rearward ends configured to engage a ground surface rearwardly and downwardly of the forward ends such that the wheel ramps are upwardly inclined at an angle similar to the angular orientation of the ramp.

4. The trailer and loading device of claim 1 wherein the follower is comprised of at least one roller mounted to the tongue of the trailer.

5. The trailer and loading device of claim 1 wherein the ramp is comprised of a "U" shaped channel and the follower is comprised of at least one roller mounted to the tongue of the trailer and configured to roll within the "U" shaped channel.

6. The trailer and loading device of claim 1 wherein the ramp includes a forward end section that is disposed angularly to a substantially horizontal orientation with respect to the remainder of the ramp and that is configured to extend over the cab and be situated no more than 1.5 inches above the truck cab.

7. The trailer and loading device of claim 1 wherein the frame includes a cross member positioned adjacent the top end of the ramp to engage and support a forward portion of the trailer in the inclined carrying position.

8. The trailer and loading device of claim 1 wherein the frame includes a cross member configured to be supported on the truck bed floor rearwardly adjacent the truck cab to engage and support a forward portion of the trailer in the inclined carrying position.

9. The trailer and loading device of claim 1 wherein the frame includes a cross member positioned adjacent the top end of the ramp and wherein the follower is comprised of multiple rollers spaced longitudinally along the trailer tongue to roll forwardly along the ramp and progressively lower the trailer frame into contact with and for support by the cross member as the winch is operated to pull the trailer to the inclined carrying position.

10. The trailer and loading device of claim 1 further comprising a lock selectively interconnecting the trailer and frame to rigidly lock the trailer and frame together.

11. The trailer and loading device of claim 1 further comprising a pair of wheel chocks configured to be positioned on the truck bed in alignment with the trailer wheels to engage and prevent the trailer from moving forwardly past the carrying position.

12. A trailer and loading device for use with a transport vehicle having a support surface, comprising:
    a frame including an upright brace section and an inclined ramp section extending from a rearward end angularly upwardly to a forward end;
    said rearward end being configured to rest against a transport vehicle support surface;
    a winch operably secured to the frame;
    a trailer including wheels supporting a trailer frame, the trailer frame including a forwardly projecting tongue and a follower configured to engage and move along the ramp section responsive to operation of the winch;
    wherein the winch is configured for selective attachment to the trailer and is selectively operable to pull the trailer onto the frame with the follower member supported and movably guided upward and forwardly on the ramp section to an inclined carrying position wherein the trailer wheels rest against the support surface adjacent the rearward end of the ramp and the trailer frame is inclined upwardly from the wheels whereby the trailer and loading device is designed to have the trailer wheels rest on the bed floor during transit by a transport vehicle, for additional load support stability.

13. The trailer and loading device of claim 12 wherein the follower is comprised of at least one roller mounted to the tongue of the trailer.

14. The trailer and loading device of claim 12 wherein the ramp is comprised of a "U" shaped channel and the follower is comprised of at least one roller mounted to the tongue of the trailer and configured to roll within the "U" shaped channel.

15. The trailer and loading device of claim 12 wherein the ramp includes a forward end section that is disposed angularly to a substantially horizontal orientation with respect to the remainder of the ramp.

16. The trailer and loading device of claim 12 wherein the upright brace section includes a cross member positioned adjacent the forward end of the ramp to engage and support a forward portion of the trailer at positions laterally spaced from the ramp when the trailer is in the inclined carrying position.

17. The trailer and loading device of claim 12 wherein the upright brace section includes a cross member positioned adjacent the forward end of the ramp and wherein the follower is comprised of multiple rollers spaced longitudinally along the trailer tongue to roll forwardly along the ramp and progressively lower the trailer frame into contact with the cross member at positions laterally spaced from the ramp as the winch is operated to pull the trailer to the inclined carrying position.

18. The trailer and loading device of claim 12 further comprising a lock selectively interconnecting the trailer and frame to rigidly lock the trailer and frame together.

19. The trailer and loading device of claim 12 further comprising:

a cross member on the frame positioned to support a forward portion of the trailer in the carrying position; and a lock selectively interconnecting the trailer and frame to rigidly lock the trailer and frame together.

* * * * *